United States Patent
Ezrielev et al.

(10) Patent No.: US 11,989,172 B2
(45) Date of Patent: May 21, 2024

(54) SYSTEM AND METHOD FOR MANAGING TRANSITION BETWEEN INFERENCE MODELS ACROSS MULTIPLE DATA PROCESSING SYSTEMS

(71) Applicant: Dell Products L.P., Round Rock, TX (US)

(72) Inventors: Ofir Ezrielev, Beer Sheva (IL); Avitan Gefen, Tel Aviv (IL); Nadav Azaria, Beer Sheva (IL)

(73) Assignee: Dell Products L.P., Round Rock, TX (US)

( * ) Notice: Subject to any disclaimer, the term of this patent is extended or adjusted under 35 U.S.C. 154(b) by 209 days.

(21) Appl. No.: 17/863,027

(22) Filed: Jul. 12, 2022

(65) Prior Publication Data

US 2024/0020296 A1    Jan. 18, 2024

(51) Int. Cl.
G06F 16/23    (2019.01)

(52) U.S. Cl.
CPC .................. *G06F 16/2379* (2019.01)

(58) Field of Classification Search
CPC .................................... G06F 16/2379
USPC ........................................ 707/695
See application file for complete search history.

(56) References Cited

U.S. PATENT DOCUMENTS

| | | | | |
|---|---|---|---|---|
| 2020/0019393 | A1* | 1/2020 | Vichare | G06N 20/00 |
| 2021/0117859 | A1* | 4/2021 | Rogers | G06F 8/71 |
| 2022/0383149 | A1* | 12/2022 | Cao | G06N 5/04 |

OTHER PUBLICATIONS

Pearl, Judea. "Causal inference in statistics: An overview." Statistics surveys 3 (2009): 96-146. https://projecteuclid.org/journals/statistics-surveys/volume3/issue-none/Causal-inference-in-statistics-An-overview/10.1214/09-SS057.short.

Xie, Yaochen, et al. "Self-supervised learning of graph neural networks: A unified review." IEEE Transactions on Pattern Analysis and Machine Intelligence (2022). https://ieeexplore.ieee.org/abstract/document/9764632/.

Kumar, Manoj, et al. "Genetic algorithm: Review and application." Available at SSRN 3529843 (2010). https://papers.ssrn.com/sol3/papers.cfm?abstract_id=3529843.

Gholami, Amir, et al. "A survey of quantization methods for efficient neural network inference." arXiv preprint arXiv:2103.13630 (2021). https://arxiv.org/abs/2103.13630.

Blalock, Davis, et al. "What is the state of neural network pruning?." Proceedings of machine learning and systems 2 (2020): 129-146. https://proceedings.mlsys.org/book/296.pdf.

* cited by examiner

*Primary Examiner* — Michael Pham
(74) *Attorney, Agent, or Firm* — Womble Bond Dickinson (US) LLP

(57) ABSTRACT

Methods and systems for seamlessly changing over between inference models are disclosed. The inference models may be distributed across multiple data processing systems. Provide a seamless changeover, updated inference models and original inference models may be managed in accordance with an update framework. The update framework may ensure that the original inference model continues to operate until all of the portions of the updated inference model are in place and ready to operate. During the update process, the update framework may ensure that redundancy goals continue to be met so that failures of some of the data processing systems are not be fatal to continued operation of at least one of the inference models, such as the original or updated inference model.

20 Claims, 14 Drawing Sheets

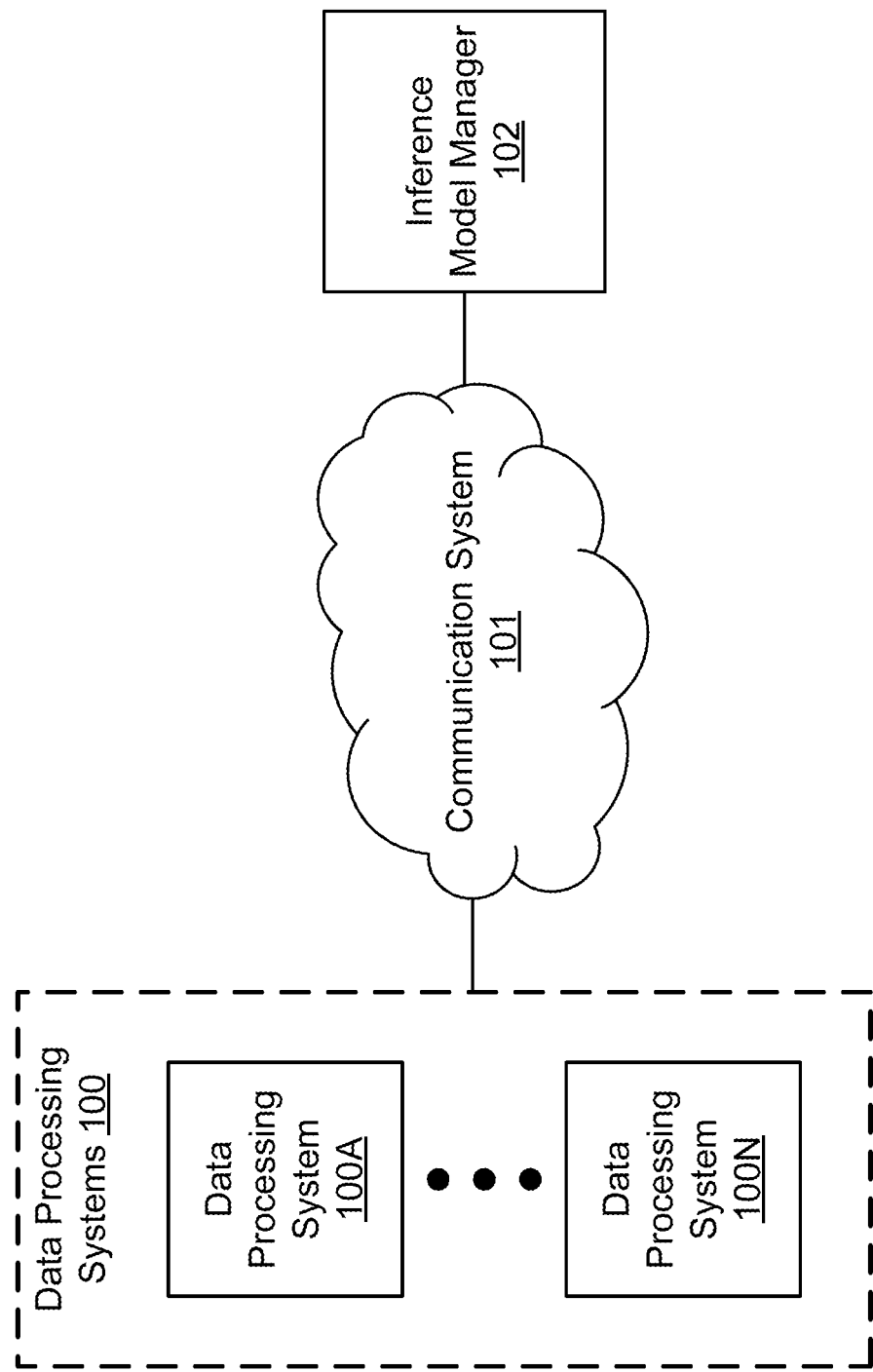

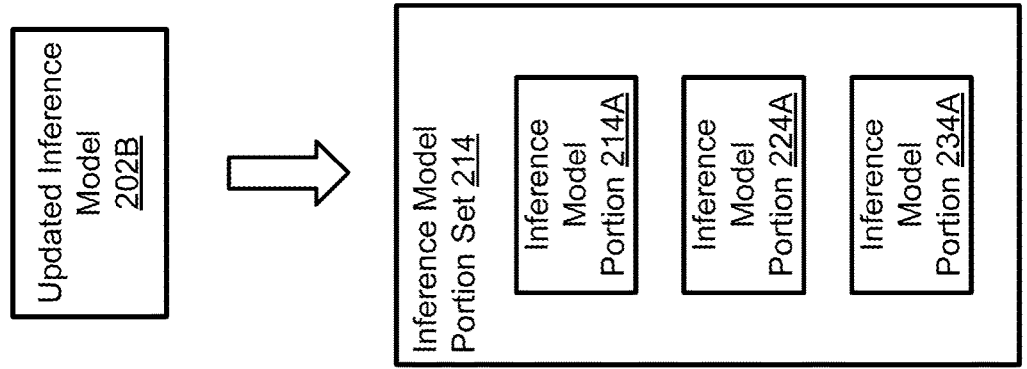
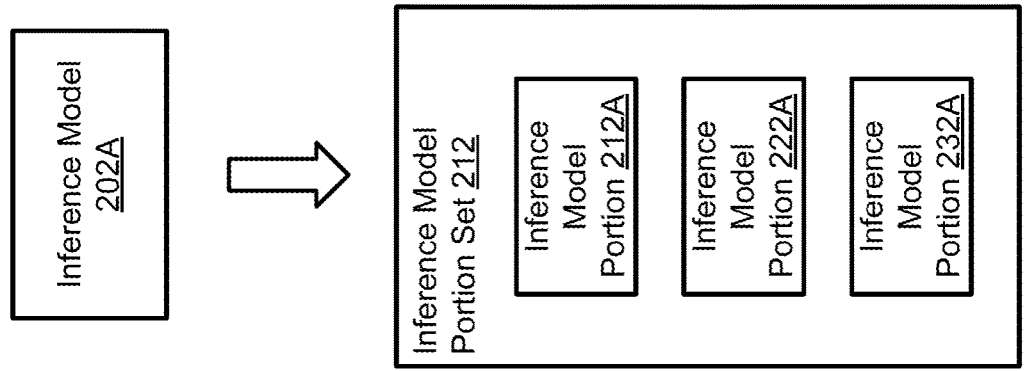
FIG. 2D

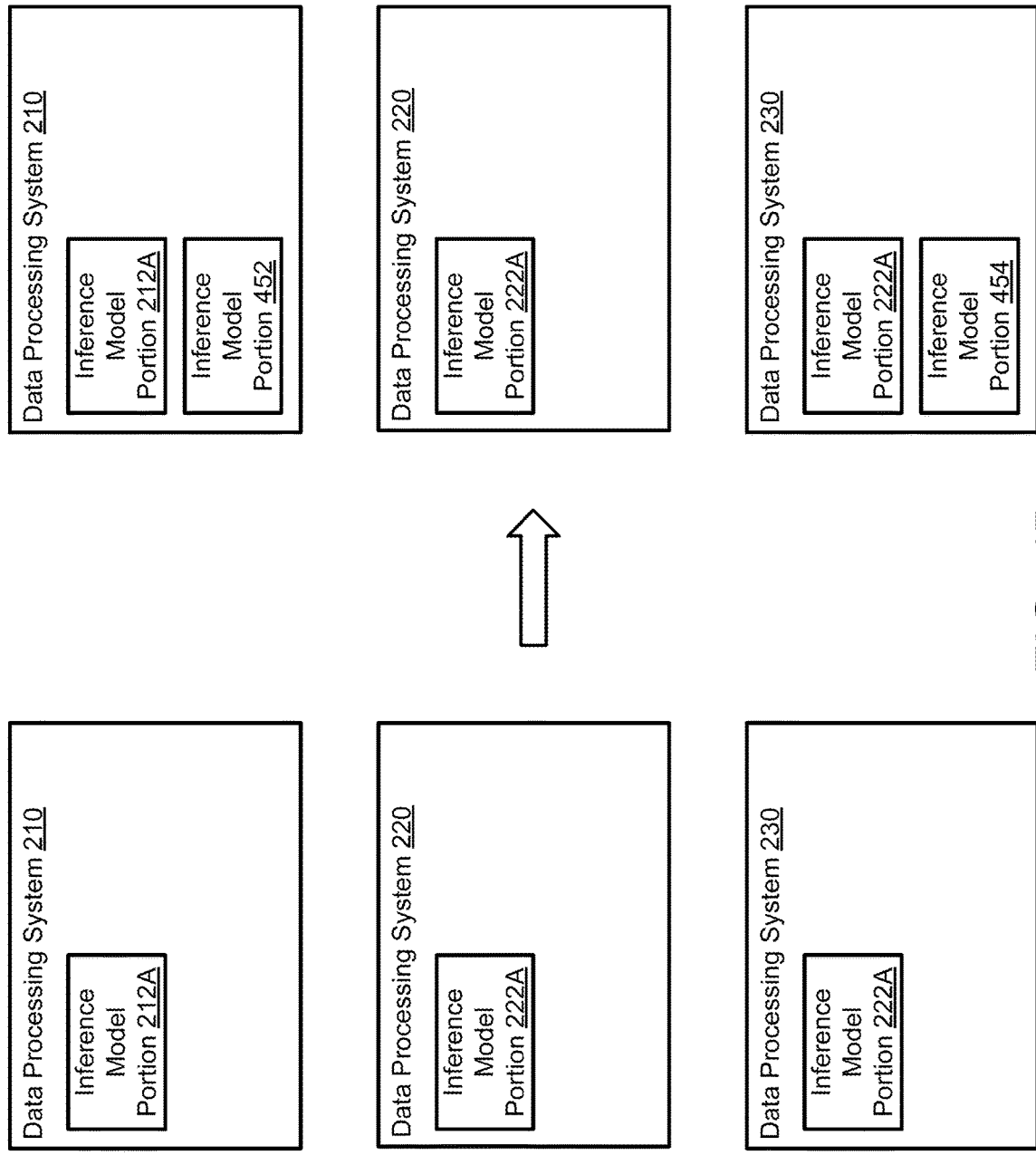

SYSTEM AND METHOD FOR MANAGING TRANSITION BETWEEN INFERENCE MODELS ACROSS MULTIPLE DATA PROCESSING SYSTEMS

FIELD

Embodiments disclosed herein relate generally to inference generation. More particularly, embodiments disclosed herein relate to systems and methods to manage inference models for inference generation.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements FIG. 1 shows a block diagram illustrating a system in accordance with an embodiment.

FIG. 2D shows a block diagram illustrating two inference models in accordance with an embodiment.

FIGS. 4B-4C show diagrams illustrating update of an inference model over time in accordance with an embodiment.

DETAILED DESCRIPTION

Figure 2A:
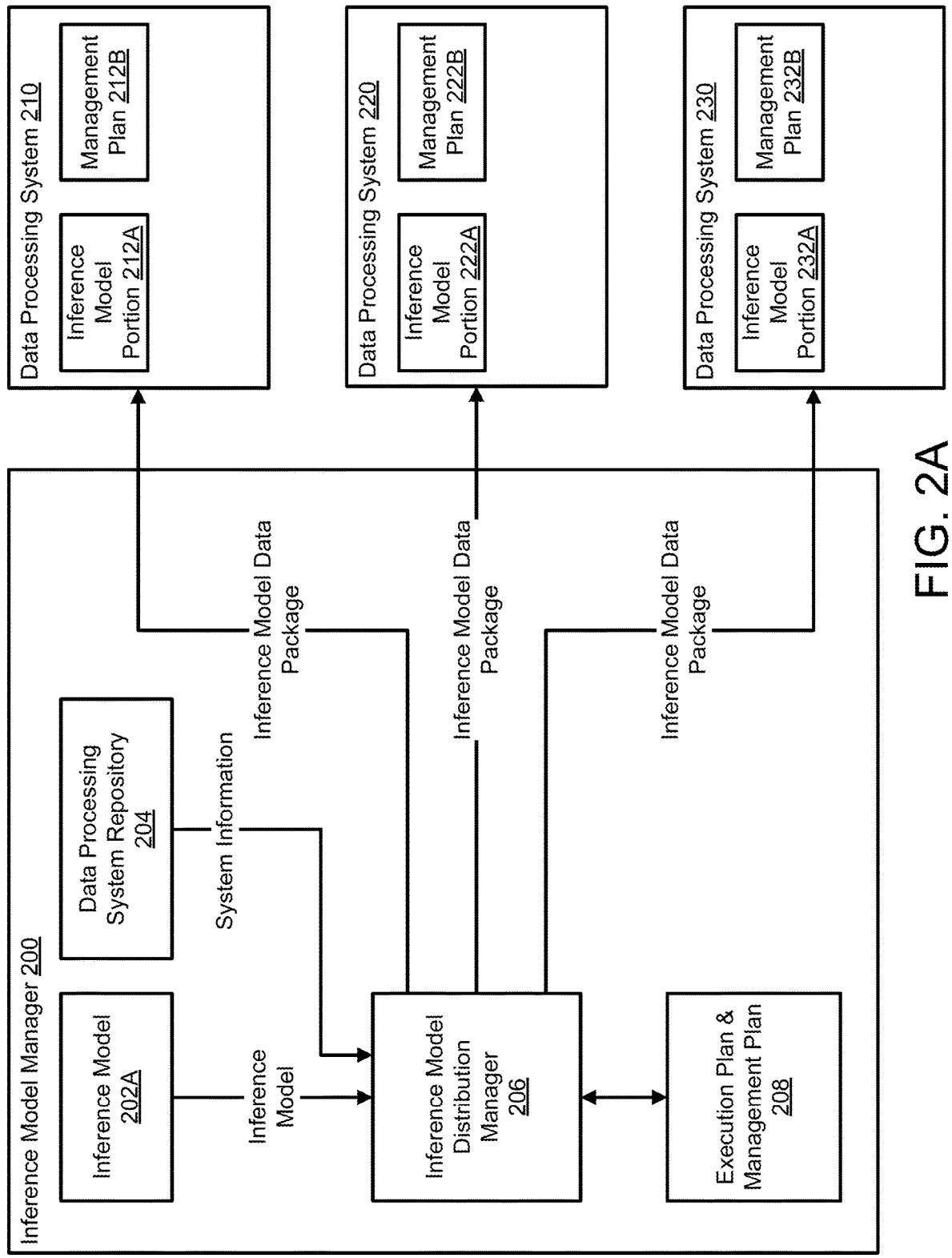
FIG. 2A shows a block diagram illustrating an inference model manager and multiple data processing systems over time in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for inference generation and inference model management in a distributed system. To manage inference generation, the system may include an inference model manager and any number of data processing systems. Hosting and executing an inference model by one data processing system may consume undesirable quantities of computing resources and increase computational overhead throughout a distributed environment.

In order to reduce computing resource consumption, the inference model manager may partition the inference model into portions and distribute the portions across multiple data processing systems. The data processing systems may perform other functions within a distributed environment and may have computing resources available to host and execute portions of an inference model. Cooperative execution of the portions of the inference model may spread the computational load for inference generation across the system.

Overtime the inference models may be updated. For example, as new information becomes available, the inference models may be updated to provide more accurate inferences. To deploy updated inference models, the inference models may be partitioned into portions and distributed to the data processing systems for operation. However, during this process, consumers of the inferences provided by the original inference model may desire to continue to receive inferences until the updated inference model is operational.

Embodiments disclosed herein may provide methods and systems for seamlessly changing over between inference models. To do so, updated inference models and original inference models may be managed in accordance with an update framework. The update framework may ensure that the original inference model continues to operate until all of the portions of the updated inference model are in place and ready to operate. During the update process, the update framework may ensure that redundancy goals continue to be met so that failures of some of the data processing systems may not be fatal to continued operation of at least one of the inference models (e.g., an original and an updated inference model).

The update framework may treat each of the inference models as a separate unit. Consequently, the operation of each of the inference models may be continued independently until both inference models (e.g., original and updated) are ready for seamless changeover.

To facilitate management of inference models, the portions of the inference models may be tagged with metadata to define to which unit each portion belongs and/or to define the relationships between different inference models. In this manner, each data processing system hosting a portion of an inference model may be able to independently operate and perform functionality of the update framework.

Thus, embodiments disclosed herein may more efficiently marshal limited computing resources for the generation of inferences that may be used to drive subsequent processes. By improving the efficiency of inference generation, a system in accordance with embodiments disclosed herein may perform other desired functions thereby improving system throughput without increasing cost through addition of hardware resources. The disclosed embodiments may be broadly applicable to many systems include, for example, autonomous device (or groups thereof), edge compute, manufacturing environment, and/or other systems. Additionally, by providing for a seamless changeover processes, embodiments disclosed herein may improve the likelihood that downstream consumers of inference are able to continue to obtain inferences.

In an embodiment, a method for executing an inference model across multiple data processing systems that each individually have insufficient computing resources to complete timely execution of the inference model is provided. The method may include obtaining an update for the inference model deployed across the data processing system; identifying portions of the inference model hosted by the data processing systems and redundancy levels for each of the portions of the inference model; obtaining an inference model update plan that maintains operation of the inference model during deployment of portions of an updated inference model, the inference model update plan being based on the redundancy levels for each of the portions of the inference model; obtaining inference model data packages for the data processing systems based on the inference model update plan and the updated inference model; distributing the inference model data packages to the data processing systems; and initiating a seamless changeover between execution of the inference model and execution of the updated inference model across the data processing systems using the distributed inference model data packages and a pattern indicated by the inference model update plan.

The pattern may specify when execution of each of the portions of the inference model is terminated (e.g., decommissioned) as part of the seamless changeover.

The pattern may maintain a first quantity of a first portion of the portions of the inference model that are executable and a second quantity of a corresponding portion of the portions of the updated inference model (e.g., replacements for the original portions) that are executable above a threshold level based on a redundancy level of the redundancy levels associated with the first portion of the portions of the inference model during the seamless changeover.

The redundancy levels for each of the portions of the inference model may indicate quantities of redundant instances of the portions of the inference model hosted by the data processing systems.

The inference model update plan may also be based on an acceptable level of deviation from the redundancy levels during the seamless changeover.

The acceptable level of deviation may indicate a reduced number of instances of a portion of the portions of the inference model that may be maintained during the seamless changeover, the reduced number being less than a number of instances indicated by the redundancy levels. The acceptable level of deviation may indicate an increased number of instances of a portion of the portions of the inference model and a complementary portion of the portions of the updated inference model that may be maintained during the seamless changeover, the increased being greater than a number of instances indicated by the redundancy levels.

The complementary portion of the portions of the updated inference model is adapted to, after the seamless changeover, replace the functionality provided by the portion of the portions of the inference model.

The data packages include corresponding portions of the portions of the updated inference model and management data, the management data usable to coordinate the seamless changeover. The management data specifies a versioning relationship between the updated inference model and the inference model.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services that may utilize inferences generated by executing an inference model across multiple data processing systems throughout a distributed environment.

The system may include inference model manager 102. Inference model manager 102 may provide all, or a portion, of the computer-implemented services. For example, inference model manager 102 may provide computer-implemented services to users of inference model manager 102 and/or other computing devices operably connected to inference model manager 102. The computer-implemented services may include any type and quantity of services which may utilize, at least in part, inferences generated by an inference model executed across multiple data processing systems throughout a distributed environment.

For example, inference model manager 102 may be used as part of a quality control system in which inferences generated using an inference model are used to make quality control decisions regarding a product. An inference model may be executed across multiple data processing systems which collectively may generate the inferences. In an industrial environment, for example, inference model manager 102 may distribute portions of an inference model to a variety of data processing systems (e.g., devices with available computing resources such as temperature sensors, assembly line controllers, etc.) which may collectively generate an inference regarding the success or failure of a product to meet quality control standards. Inference model manager 102 may be utilized in other types of environments without departing from embodiments disclosed herein.

To facilitate execution of inference models across multiple data processing systems, the system may include one or more data processing systems 100. Data processing systems 100 may include any number of data processing systems (e.g., 100A-100N). For example, data processing systems 100 may include one data processing system (e.g., 100A) or multiple data processing systems (e.g., 100A-100N) that may independently and/or cooperatively facilitate the execution of inference models.

For example, all, or a portion, of the data processing systems 100 may provide computer-implemented services to users and/or other computing devices operably connected to data processing systems 100. The computer-implemented services may include any type and quantity of services including, for example, generation of a partial or complete processing result using a portion of an inference model. Different data processing systems may provide similar and/or different computer-implemented services.

Inferences generated by inference models may be utilized in order to provide computer-implemented services to downstream consumers of the services. However, the quality of the computer-implemented services may be dependent on the accuracy of the inferences and, therefore, the complexity of the inference model. An inference model capable of generating accurate inferences may consume an undesirable quantity of computing resources during operation. The addition of a data processing system dedicated to hosting and operating the inference model may increase communication bandwidth consumption, power consumption, and/or computational overhead throughout the distributed environment.

Further, overtime the inference models may need to be updated. For example, changes in use of inferences may require that different types of inference be generated. In another example, after an inference model is generated additional information that may be used to improve the inference model may be obtained.

For example, consider a scenario in which an inference model is used to categorize product as the product is produced. After the inference model is deployed, additional information regarding the product (e.g., more examples of classifications) may be identified.

To improve the classification accuracy provided by the inference model, the inference model may be updated (e.g., retrained) based on the new information.

In general, embodiments disclosed herein may provide methods, systems, and/or devices for executing inference models across multiple data processing systems that each individually have insufficient computing resources to complete timely execution of the inference model. To execute an inference model across multiple data processing systems, a system in accordance with an embodiment may partition an inference model into portions, each portion being distributed to a data processing system capable of hosting and operating the portion of the inference model. The inference model may be partitioned in order to reduce inter-data processing system communications, thereby distributing the computing resource load amongst the data processing systems and conserving communication system bandwidth throughout the distributed environment.

To execute the inference model, the distributed portions may execute on the host data processing systems cooperatively with other portions. Overtime, as the inference model is updated, portions of the updated distributed model may be distributed and replace the existing portions of the inference model in a seamless changeover that facilitates continued execution of the inference model until the updated inference model begins execution. When doing so, tags or other types of metadata may be used to manage various inference models, and portions thereof. In this manner, changeover between execution of a previous and updated inference model may be seamless without interruption to downstream consumers that may depend on the inferences provided by the inference models.

To provide the above noted functionality, inference model manager 102 may (i) obtain portions of an inference model and/or updated inference models, (ii) distribute the portions of the inference models to data processing systems 100, and/or (iii) execute the inference models using the portions of the inference models to obtain inference model results.

To obtain portions of an inference model (or updated inference model), inference model manager 102 may generate (or otherwise obtain) an inference model. The inference model may include a neural network inference model, and inference model manager 102 may represent the neural network inference model as a bipartite graph. The bipartite graph may indicate neural network parameters (e.g., weights, biases, etc.) associated with each neuron of the neural network inference model. The bipartite graph may include a first set of elements based on parameters of the neural network inference model (e.g., weights, biases, etc.). The bipartite graph may also include a second set of elements based on values of neurons of the neural network inference model. The first set of elements and the second set of elements may be connected by edges on the bipartite graph to indicate which parameters may be associated with each neuron. While described above with respect to a neural network inference model, other types of inference models may be utilized without departing from embodiments disclosed herein.

Inference model manager 102 may partition the inference model into portions using the bipartite graph. Each portion of the inference model may be distributed to one data processing system and, therefore, the quantity of portions may be based on the quantity of data processing systems. In addition, each portion of the inference model may depend on the quantity of computing resources available to each data processing system. Available computing resources of a data processing system may be based on a quantity of available storage of the data processing system, a quantity of available memory of the data processing system, a quantity of available communication bandwidth between the data processing system and other data processing systems, and/or a quantity of available processing resources of the data processing system.

In order to reduce communication bandwidth consumption during execution of the inference model, portions of the inference model may be selected in order to reduce edges of the bipartite graph between the portions of the bipartite graph corresponding to the selected portions of the inference model. By reducing edges of the bipartite graph between the portions of the inference model, neurons that depend on the same (and/or similar) parameters may be included in one portion of the inference model thereby reducing the frequency of transmissions between data processing systems during execution of the inference model and the quantity of data processing systems involved in the execution of the inference model. Reducing the quantity of data processing systems involved in the execution of the inference model may conserve computational resource expenditure throughout the distributed environment. By doing so, overall energy consumption may also be reduced throughout the distributed environment.

Inference model manager 102 may utilize the portions of the inference model to obtain an execution plan, the execution plan including instructions for distribution and timely execution of the inference model. The execution plan may be based on the portions of the inference model and the needs of a downstream consumer of the inferences generated by the inference model. Additionally, the execution plan may specify levels of redundancy for the portions of the inference model. The levels of redundancy may specify the number of instances of each portion of the inference model expected to be hosted by different data processing systems used to improve the likelihood of continued operation of the inference model even as host data processing systems become inoperable, unreachable, or otherwise impact the operation of hosted inference model portions. The levels of redundancy may be based, for example, on expectations or needs of downstream consumers of the inferences generated by the inference models.

In an embodiment, inference model manager 102 may distribute the portions of the inference model to the data processing systems such that one portion (or multiple instances depending on redundancy level) of the inference model may be distributed to corresponding data processing system in accordance with the execution plan. By doing so, the data processing systems may collectively execute the inference model to obtain an inference model result, and may provide a level of redundancy such that failures of some of the data processing systems may not prevent continued operation of the inference model.

In an embodiment, inference model manager 102 may execute the inference model using the portions of the inference model distributed to the data processing systems and the execution plan in order to obtain an inference model result. Executing the inference model may include distributing the execution plan to the data processing systems, obtaining an inference model result from the data processing systems, and/or providing the inference model result to a downstream consumer of the inference model result.

When distributing portions of an inference model, inference model manager 102 may take into account whether the inference model is a new inference model or an updated inference model. If updated, inference model manager 102 may only distribute copies of portions of the updated inference model that differ from those portions of a previous inference model already hosted by data processing systems.

As part of distributing the portions of the updated inference model and/or decommissioning portions of previously distributed inference models, inference model manager 102 may select where and when (e.g., a pattern) to distribute and decommission portions of inference models such that continued operation of previously distributed inference models continues (or is able to continue) until the updated inference model is ready for operation. For example, inference model manager 102 may perform a rollout of the portions based on the redundancy levels of the portions of updated inference model and/or a previously distributed inference model which is being updated.

To facilitate management of various inference models, inference model manager 102 may generate metadata such as tags. The tags may include information regarding portions of inference models. The tags may, for example, facilitate reuse of inference model portions, roll back and/or roll forward capability for related inference models (e.g., updated and legacy inference models), and/or to ensure compliance with execution plans for inference models. Additionally, inference model manager 102 may manage the inference models in accordance with an update model that allows a level of divergence from redundancy levels during inference model updates to provide flexibility during the update process.

Figure 3A:
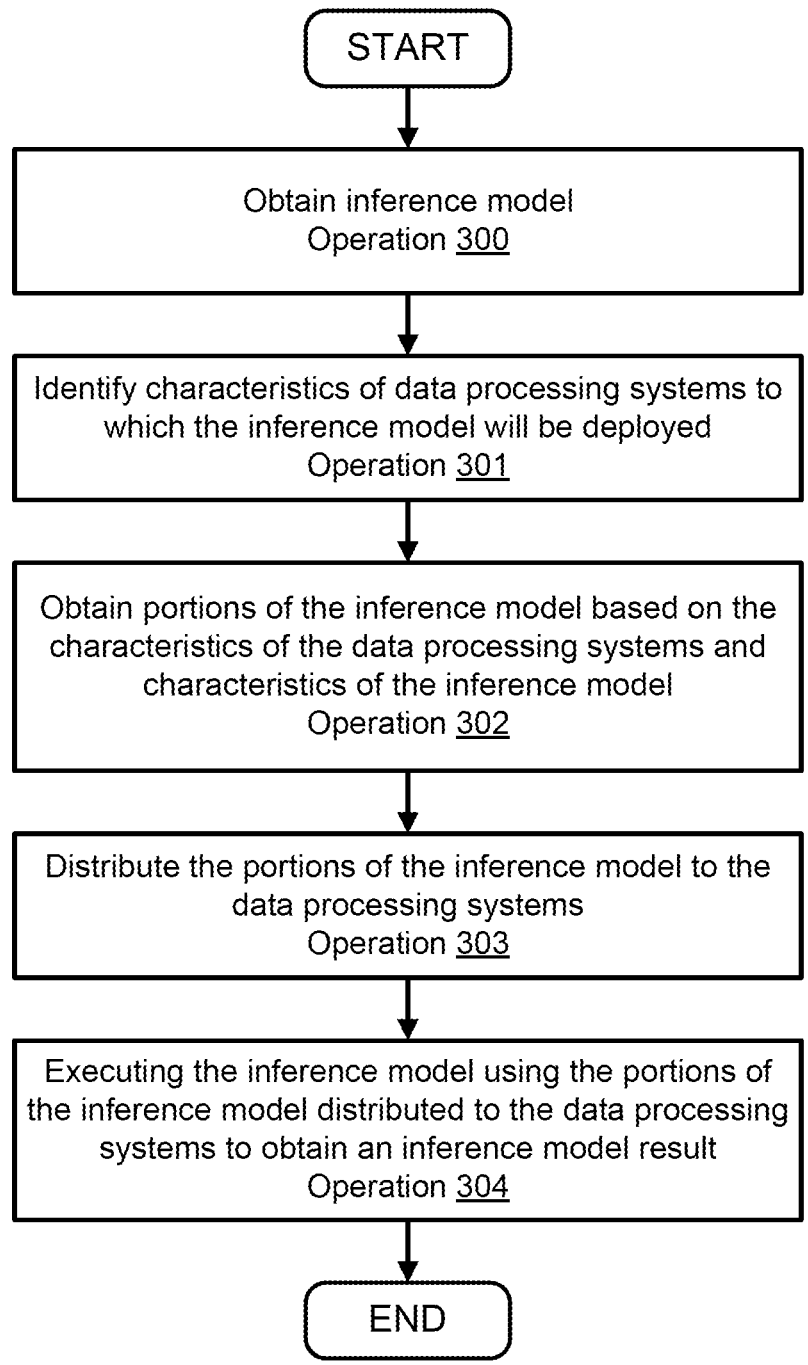
FIG. 3A shows a flow diagram illustrating a method of executing an inference model across multiple data processing systems throughout a distributed environment in accordance with an embodiment.
Figure 3B:
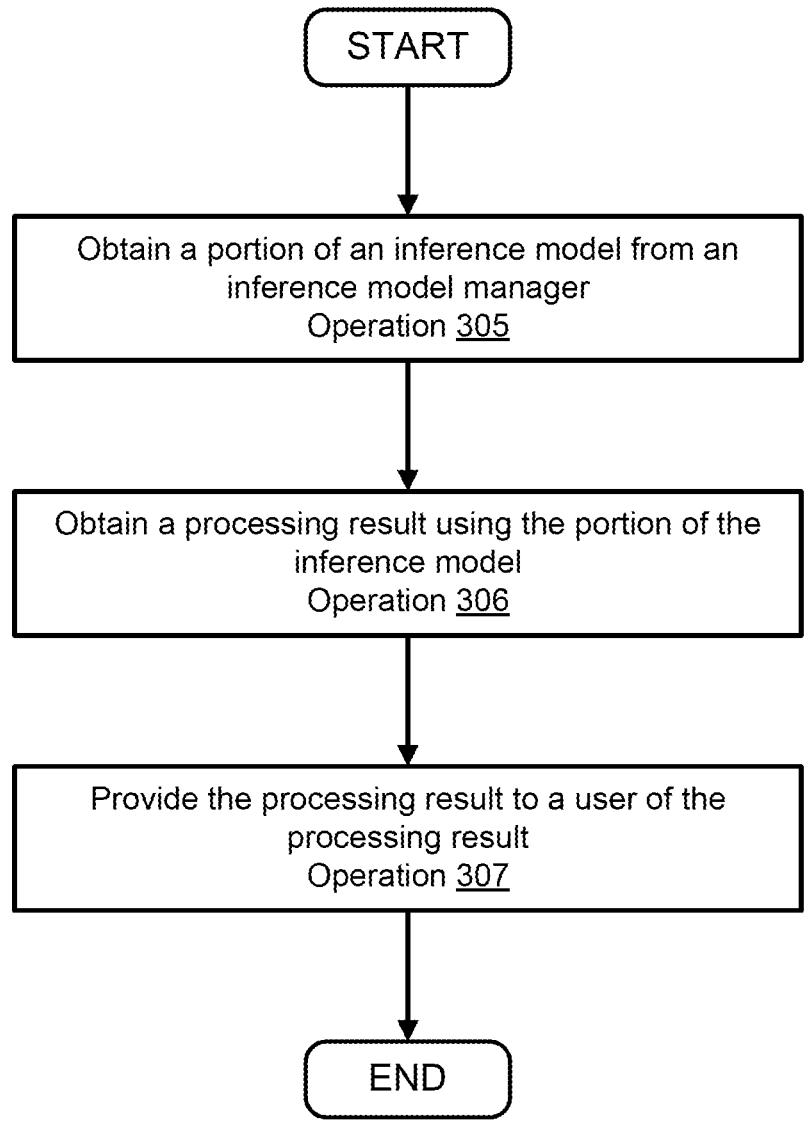
FIG. 3B shows a flow diagram illustrating a method of obtaining a processing result using a portion of an inference model in accordance with an embodiment.
Figure 3C:
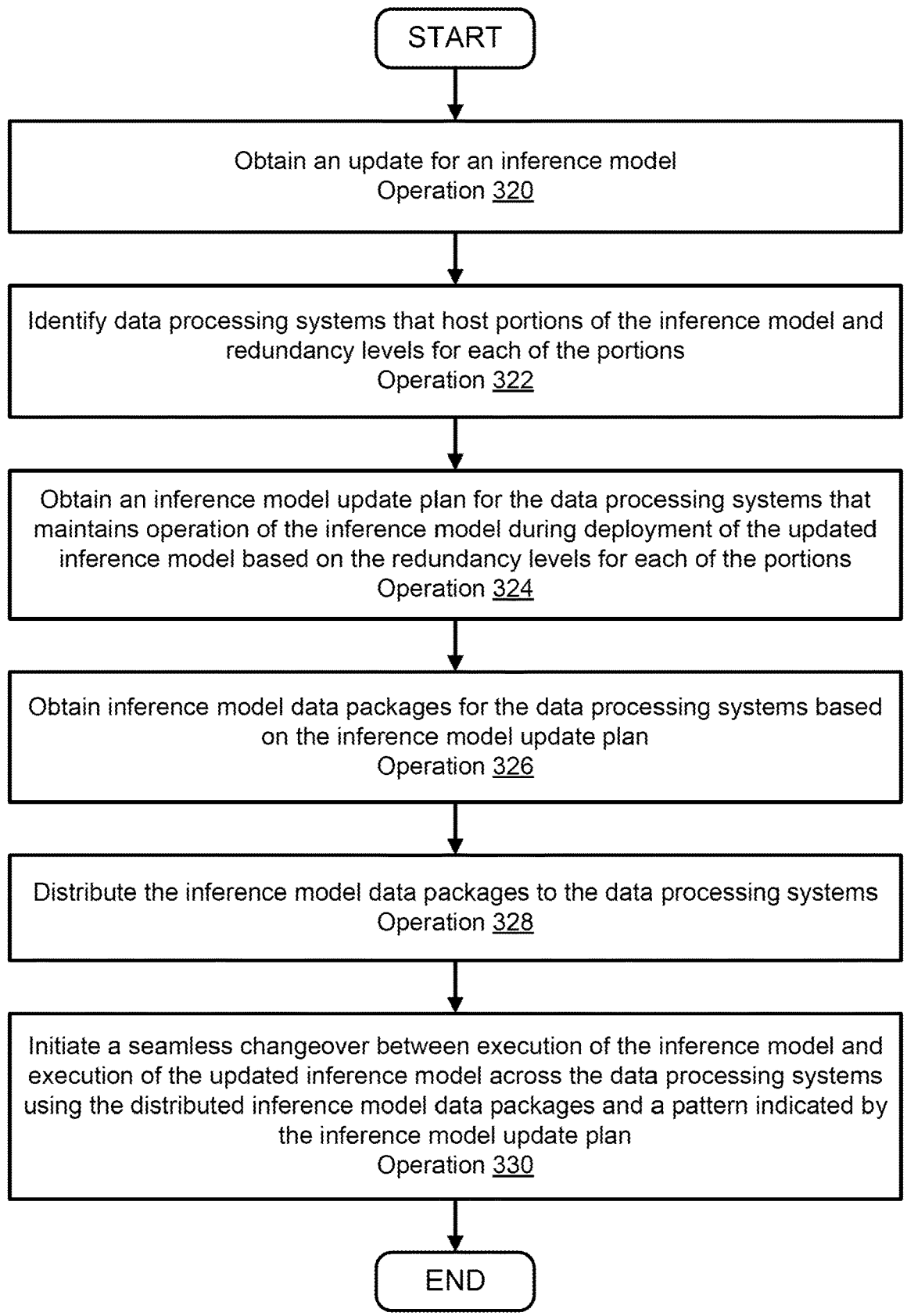
FIG. 3C shows a flow diagram illustrating a method of updating an inference model across multiple data processing systems throughout a distributed environment in accordance with an embodiment.

When performing its functionality, inference model manager 102 may perform all, or a portion, of the methods and/or actions shown in FIGS. 3A-3C.

To provide their functionality, data processing systems 100 may (i) obtain portions of an inference model, (ii) obtain a processing result using the portions of the inference model, and/or (iii) provide the processing result to a user of the processing result. Additionally, as updated inference model portions are obtained, the data processing system may manage existing and updated portions of the inference models in accordance with an inference model update plan provided by inference model manager 102. By doing so, a distributed system may ensure that deployed inference models meet redundancy goals for continued execution of inference models during inference model deployment and/or updating.

When performing their functionality, data processing systems 100 may perform all, or a portion, of the methods and/or actions shown in FIGS. 3A-3C.

Data processing systems 100 and/or inference model manager 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data processing systems 100 are implemented using an internet of things (IoT) device, which may include a computing device. The IoT device may operate in accordance with a communication model and/or management model known to the inference model manager 102, other data processing systems, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, diagrams of a system over time in accordance with an embodiment are shown in FIGS. 2A-2F.

Turning to FIG. 2A, a diagram of inference model manager 200 and data processing systems 210-230 is shown. Inference model manager 200 may be similar to inference model manager 102, and data processing systems 210-230 may be similar to any of data processing systems 100. In FIG. 2A, inference model manager 200 and data processing systems 210-230 are connected to each other via a communication system (not shown). Communications between inference model manager 200 and data processing systems 210-230 are illustrated using lines terminating in arrows.

As discussed above, inference model manager 200 may provide computer-implemented services by executing an inference model across multiple data processing systems that each individually have insufficient computing resources to complete timely execution of the inference model. The computing resources of the individual data processing systems may be insufficient due to: (i) insufficient available storage to host the inference model and/or (ii) insufficient processing capability for timely execution of the inference model.

In order to do so, inference model manager 200 may obtain portions of an inference model and may distribute the portions of the inference model to data processing systems 210-230. The portions may be based on: (i) the computing resource availability of the data processing systems 210-230 and (ii) communication bandwidth availability between the data processing systems. By doing so, inference model manager 200 may distribute the computational overhead and bandwidth consumption associated with hosting and operating the inference model across multiple data processing systems while reducing communications between data processing systems 210-230 throughout the distributed environment.

In order to obtain portions of the inference model, inference model manager 200 may host an inference model distribution manager 206. Inference model distribution manager 206 may (i) obtain an inference model (e.g., 202A), (ii) identify characteristics of data processing systems to which the inference model may be deployed, (iii) obtain portions of the inference model based on the characteristics of the data processing systems and characteristics of the inference model and desired level of redundancy for the inference model, (iv) distribute the portions of the inference model to the data processing systems, and/or (v) execute the inference model using the portions of the inference model distributed to the data processing systems to obtain an inference model result.

Inference model manager 200 may obtain inference model 202A. Inference model 202A may be a neural network inference model including an input layer of neurons, any number of hidden layers of neurons, and an output layer of neurons. Inference model manager 200 may obtain characteristics of the inference model 202A. Characteristics of the inference model 202A may include a quantity of layers included in the inference model 202A and a quantity of relationships between the layers of the inference model 202A. The characteristics of the inference model may indicate data dependencies of the inference model and the data dependencies may be based on the relationships between neurons.

In order to determine data dependencies of the inference model 202A, inference model distribution manager may represent inference model 202A as a bipartite graph. The bipartite graph may include a first set of elements based on parameters of the neural network inference model (e.g., weights of the neural network inference model, biases of the neural network inference model, and/or other parameters). The bipartite graph may include a second set of elements based on values of the neurons in the neural network inference model. The bipartite graph may also include edges between the first set of elements and the second set of elements, the edges representing data dependencies of the neurons and, therefore, communications necessary for execution of the inference model. By determining data dependencies, the neural network inference model may be partitioned in order to reduce transmissions between portions of the inference model during execution of the inference model. While described above with respect to a neural network inference model, other types of inference models may be utilized without departing from embodiments disclosed herein.

Each portion of the inference model may be distributed to one data processing system (or multiple to meet redundancy requirements or operational requirements of the neural networks in scenarios in which various part of a neural network may not be effectively disaggregated due to high levels of data dependencies) throughout a distributed environment. Therefore, prior to determining the portions of the inference model, inference model distribution manager 206 may obtain system information from data processing system repository 204. System information may indicate a quantity of the data processing systems, a quantity of available memory of each data processing system of the data processing systems, a quantity of available storage of each data processing system of the data processing systems, a quantity of available communication bandwidth between each data processing system of the data processing systems and other data processing systems of the data processing systems, and/or a quantity of available processing resources of each data processing system of the data processing systems. The inference model distribution manager 206 may obtain a first portion of the inference model (e.g., inference model portion 212A) based on the system information (e.g., the available computing resources) associated with data processing system 210 and based on the data dependencies of the inference model so that inference model portion 212A reduces the necessary communications between inference model portion 212A and other portions of the inference model. Inference model distribution manager 206 may repeat the previously described process for inference model portion 222A and inference model portion 232A.

Prior to distributing the inference model portions (e.g., 212A, 222A, 232A), inference model distribution manager 206 may utilize the inference model portions (e.g., 212A, 222A, 232A) to obtain an execution plan and/or management plan (e.g., 208). The execution plan may include instructions for timely execution of the inference model using the portions of the inference model and may be based on the needs of a downstream consumer of the inferences generated by the inference model.

Figure 4A:
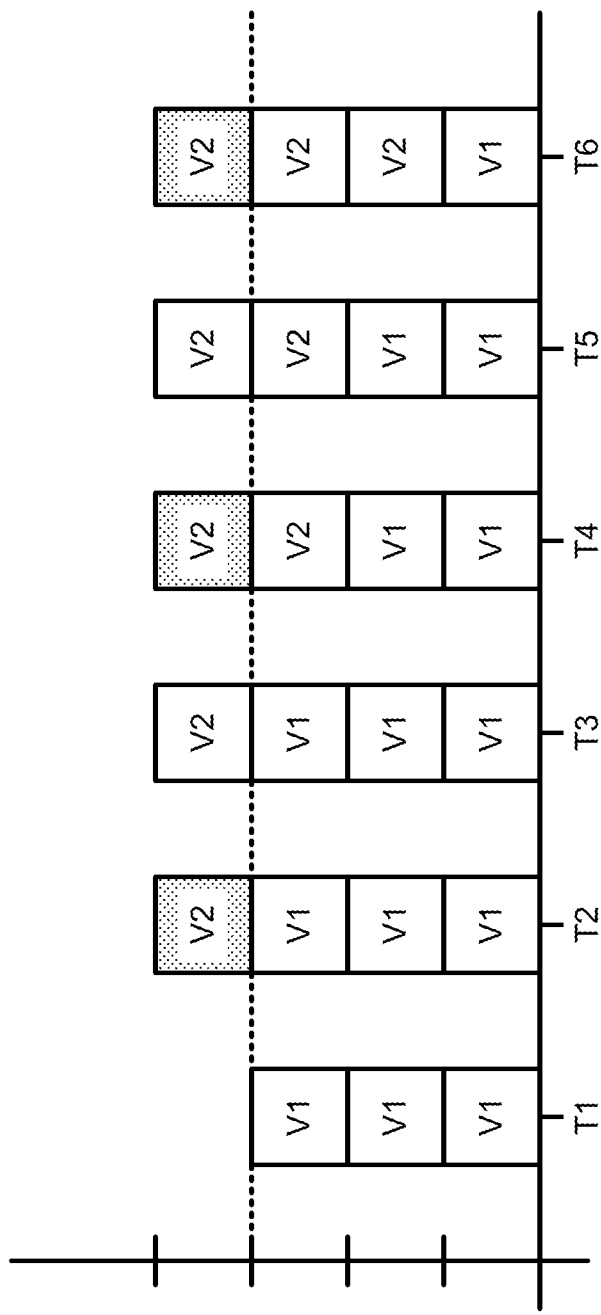
FIG. 4A shows a diagram illustrating a portion of a management plan in an in accordance with an embodiment.
Figure 4C:
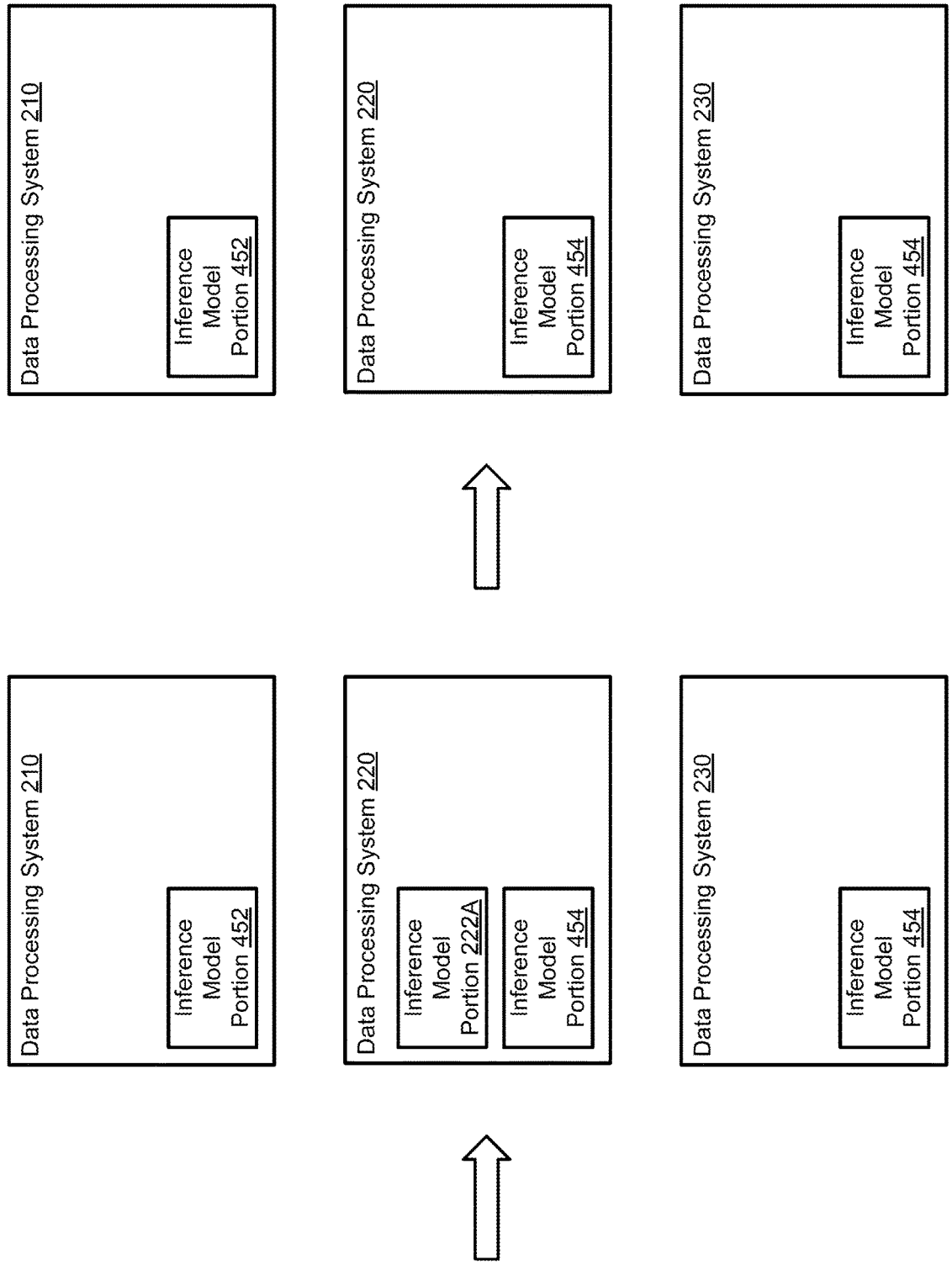

Likewise, the management plan may include instructions for implementing updated and/or replacement inference models. For example, the management plan may specify when and in which order various portions of an existing inference model may be decommissioned. The management plan may be based, for example, on levels of redundancy for the inference model that is being replaced or updated and may provide for seamless changeover between inference models. Refer to FIGS. 4A-4C for additional details regarding decommissioning of inference models in accordance with management plans.

Inference model manager 200 may distribute inference model portion 212A to data processing system 210, inference model portion 222A to data processing system 220, and inference model portion 232A to data processing system 230. Corresponding management plans (e.g., 212B, 222B, 232B) may also be distributed so that each data processing system may be able to appropriately cooperate to replace and/or update inference models.

The inference model portions may each include one or more nodes of a neural network inference model. Data processing systems 210-230 may collectively execute inference model 202A to generate an inference model result (e.g., one or more inferences). The inference model result may be usable by a downstream consumer in order to perform a task, make a control decision, and/or perform any other action set. While shown in FIG. 2A as distributing three portions of the inference model to three data processing systems, the inference model may be partitioned into any number of portions and distributed to any number of data processing systems throughout a distributed environment.

Figure 2B:
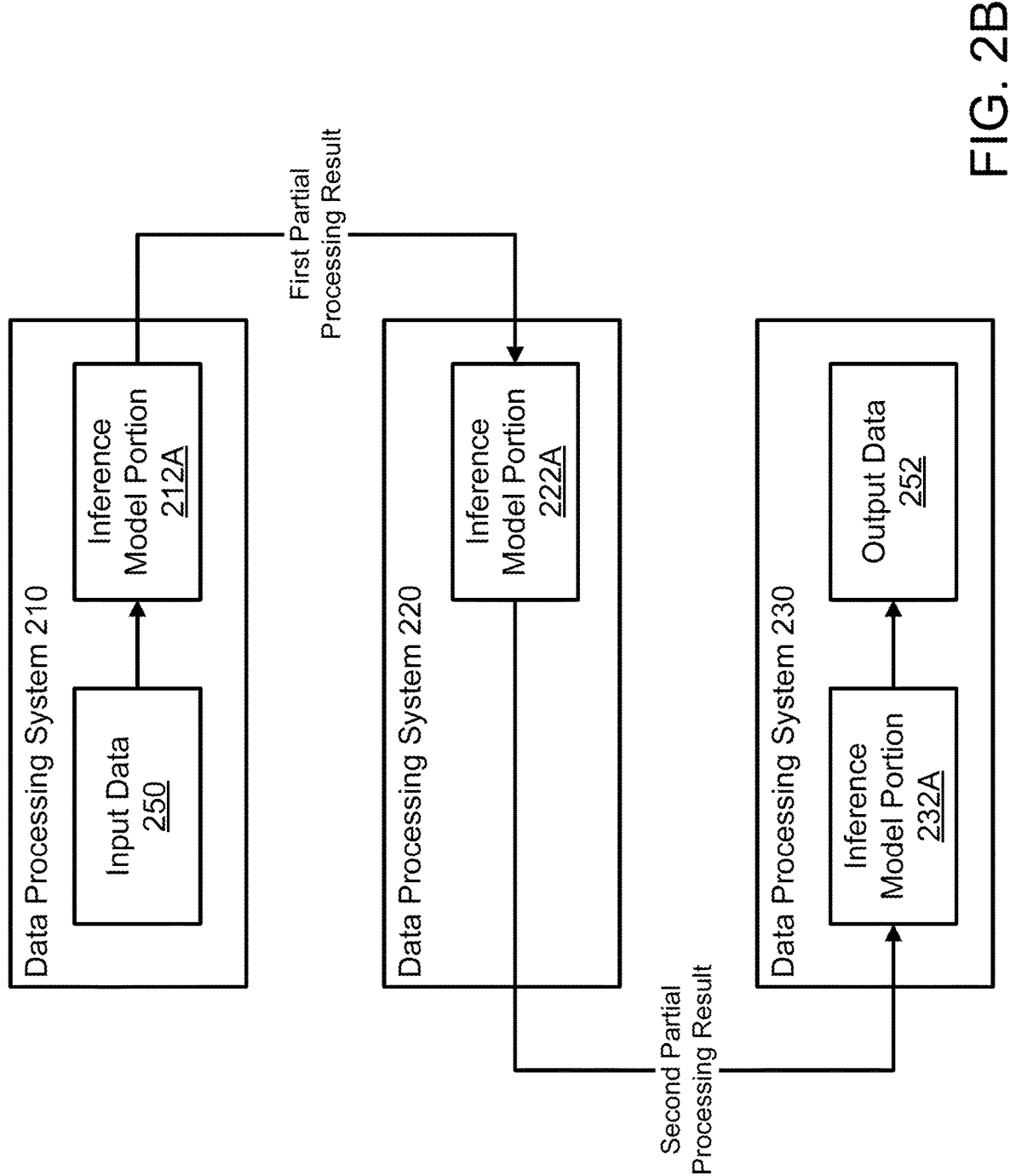
FIG. 2B shows a block diagram illustrating multiple data processing systems operating an inference model over time in accordance with an embodiment.

Turning to FIG. 2B, data processing systems 210-230 may execute the inference model. In order to do so, data processing system 210 may obtain input data 250. Input data 250 may include any data of interest to a downstream consumer of the inferences. For example, input data 250 may include data indicating the operability and/or specifications of a product on an assembly line.

Input data 250 may be fed into inference model portion 212A in order to obtain a first partial processing result. The first partial processing result may include values and/or parameters associated with a portion of the inference model. The first partial processing result may be transmitted (e.g., via a wireless communication system) to data processing system 220. Data processing system 220 may feed the first partial processing result into inference model portion 202B in order to obtain a second partial processing result. The second partial processing result may include values and/or parameters associated with a second portion of the inference model. The second partial processing result may be transmitted to data processing system 230. Data processing system 230 may feed the second partial processing result into inference model portion 232A in order to obtain output data 252. Output data 252 may include inferences collectively generated by the portions of the inference model distributed across data processing systems 210-230. The transmission of partial processing results between the data processing systems and the input taken by the data processing systems may have the appearance of a graph similar to that derived using the bipartite graph.

Output data 252 may be utilized by a downstream consumer of the data in order to perform a task, make a decision, and/or perform any other action set that may rely on the inferences generated by the inference model. For example, output data 252 may include a quality control determination regarding a product manufactured in an industrial environment. The output data 252 may indicate whether the product meets the quality control standards and should be retained or does not meet the quality control standards and should be discarded. In this example, output data 252 may be used by a robotic arm to decide whether to place the product in a "retain" area or a "discard" area.

While shown in FIG. 2B as including three data processing systems, a system may include any number of data processing systems to collectively execute the inference model.

While described above as feeding input data 250 into data processing system 210 and obtaining output data 252 via data processing system 230, other data processing systems may utilize input data and/or obtain output data without departing from embodiments disclosed herein. For example, data processing system 220 and/or data processing system 230 may obtain input data (not shown). In another example, data processing system 210 and/or data processing system 220 may generate output data (not shown). A downstream consumer may be configured to utilize output data obtained from data processing system 210 and/or data processing system 220 to perform a task, make a decision, and/or perform an action set.

Additionally, while illustrated in FIG. 2B without redundancy, any of the portions of an inference model may be hosted redundantly by any number of data processing systems to improve the likelihood of continued operation of the inference model.

Figure 2C:
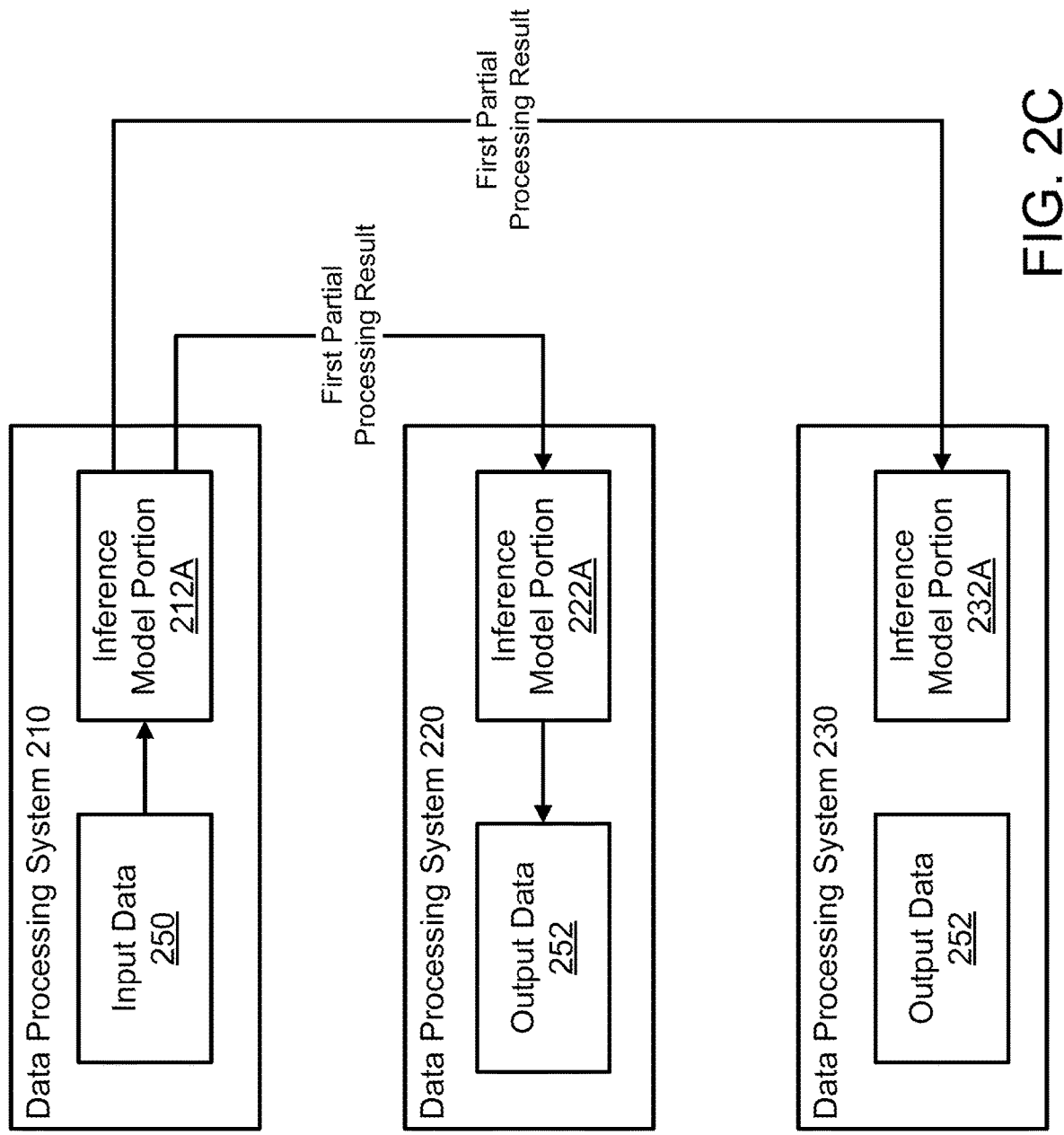
FIG. 2C shows a block diagram illustrating multiple data processing systems operating a second inference model over time in accordance with an embodiment.

For example, turning to FIG. 2C, a diagram similar to that shown in FIG. 2A in accordance with an embodiment is shown. However, now consider a scenario where the inference model is partitioned into two portions. As seen in FIG. 2C, to provide a level of redundancy, inference model portion 222A and inference model portion 232A may be duplicative (e.g., substantially identical so that each may perform the function of the other). Thus, the inference model may continue to operate when either inference model portion 222A or 232A fails to operate. In such a scenario, to facilitate continued operation of the inference model, both of these inference model portions 222A, 232A may receive the first partial processing result and may generate output data 252. Consequently, if either of data processing system 220 or data processing system 230 continues to operate, a failure of either of these data processing systems may not prevent the inference model from continuing to operate.

As discussed above, embodiments disclosed herein may manage implementation of revised or updated inference models in a manner that allows for continued execution of existing inference models. Turning to FIG. 2D, a diagram showing inference model 202A and updated inference model 202B in accordance with an embodiment is shown.

Updated inference model 202B may include updates to inference model 202A or may be a replacement for inference model 202A. For example, updated inference model 202B may have a similar architecture to inference model 202A or may have an entirely different architecture (e.g., numbers of neurons, arrangements thereof, etc.) to that of Inference model 202A.

To deploy updated inference model 202B as a replacement for inference model 202A, updated inference model 202B may be partitioned to obtain inference model portion set 214. While illustrated as including three portions, it will be appreciated that inference model portion set 214 may include similar or different numbers of portions to that of inference model portion set 212 used to deploy inference model 202A.

Figure 2E:
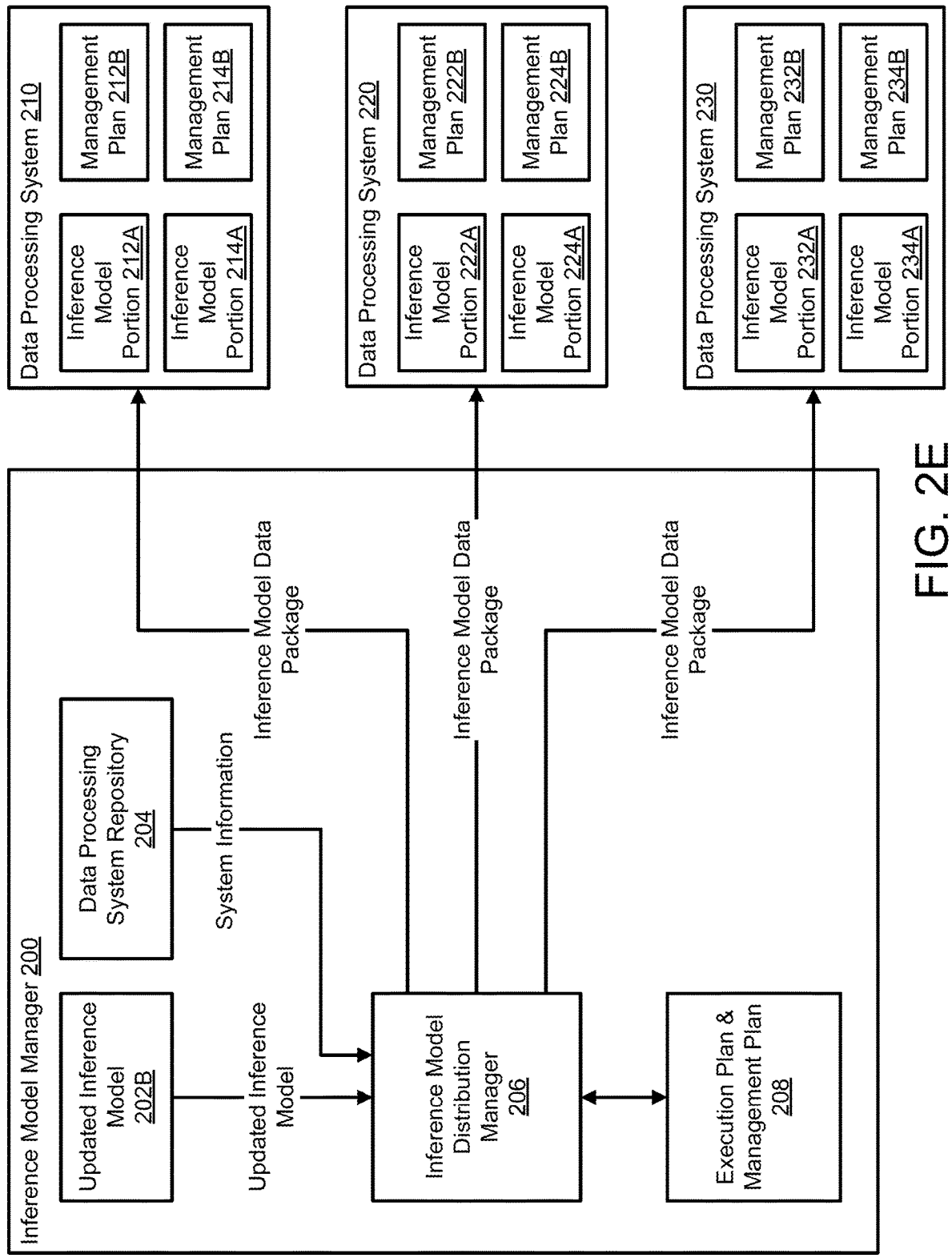
FIG. 2E shows a block diagram illustrating an inference model manager deploying an updated inference model in accordance with an embodiment.
Figure 2F:
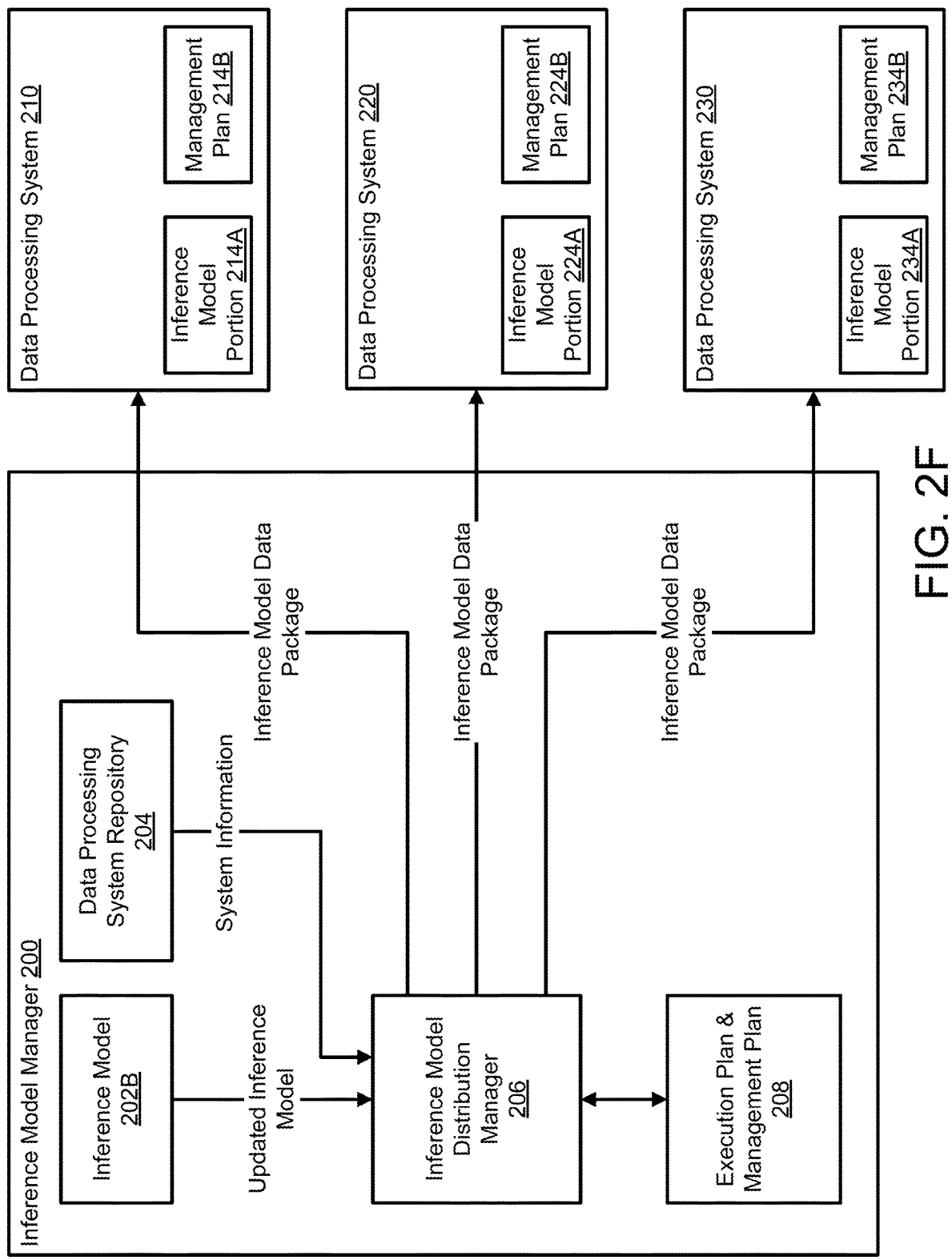
FIG. 2F shows a block diagram illustrating completion deployment of an updated inference model in accordance with an embodiment.

Turning to FIGS. 2E-2F, diagrams illustrating operations performed during deployment of inference model portion 202B is shown. As seen in FIG. 2D, updated inference model 202B may be deployed through partitioning to obtain portions, and distribution of the portions to the data processing systems 210, 220, 230. Once deployed, the inference model portions (e.g., 214A, 224A, 234A) may be being execution of updated inference model 202B. However, during this process, it may be desirable to retain operation of inference model 202A. To do so, a management plan and/or execution plan may be generated and distributed along with the inference model portions (e.g., as part of inference model data packages).

Once deployed, the portions of the legacy inference model (e.g., 202A) may be decommissioned, as seen in FIG. 2F. The management plan (e.g., 214B, 224B, 234B) may indicate when various portions of inference model 202A may be removed (e.g., suspended from execution or terminated). For example, the management plan may specify various criteria that may prevent or allow various portions of inference model 202A to be decommissioned as portions of updated inference model 202B are deployed. The plan may be based on redundancy levels for the inference models to retain a level of assurance regarding continued generation of inferences during the deployment of updated inference model 202B.

By doing so, embodiments disclosed herein may enforce an inference model update framework that facilitates continued operation of inference models during changeovers and seamless changeover once updated inference models are ready for operation.

As discussed above, the components of FIG. 1 may perform various methods to execute and manage inference models in a distributed environment. FIGS. 3A-3C illustrate methods that may be performed by the components of FIG. 1. In the diagrams discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method of executing an inference model across multiple data processing systems throughout a distributed environment is shown.

At operation 300, an inference model is obtained. The inference model may be implemented with, for example, a neural network inference model. The inference model may generate inferences that may be usable to downstream consumers.

In an embodiment, the inference model may be obtained by the inference model manager 102 using a training data set. The training data set may be fed into a neural network inference model (and/or any other type of inference generation model) to obtain the inference model. The inference model may also be obtained from another entity through a communication system. For example, an inference model may be obtained by another entity through training a neural network inference model and providing the trained neural network inference model to the inference model manager 102.

At operation 301, characteristics of data processing systems to which the inference model may be deployed are identified. Characteristics of the data processing systems may include a quantity of the data processing systems, a quantity of available storage of each data processing system of the data processing systems, a quantity of available memory of each data processing system of the data processing systems, a quantity of available communication bandwidth between each data processing system of the data processing system and other data processing systems of the data processing systems, and/or a quantity of available processing resources of each data processing system of the data processing systems. The characteristics of the data processing systems may be utilized by inference model manager 102 in order to obtain portions of an inference model as described below. The characteristics of the data processing systems may be provided to the inference model manager 102 from the data processing systems, and/or from any other entity throughout the distributed environment.

At operation 302, portions of the inference model are obtained based on the characteristics of the data processing systems and characteristics of the inference model. In order to obtain the portions of the inference model, inference model manager 102 may represent the neural network inference model as a bipartite graph, the bipartite graph indicating data dependencies between neurons in the neural network inference model. The bipartite graph may include a first set of elements based on parameters of the neural network inference model (e.g., weights of the neural network inference model, biases of the neural network inference model, and/or other parameters). The bipartite graph may include a second set of elements based on values of the neurons in the neural network inference model. In addition, the bipartite graph may include edges between the first set of elements and the second set of elements, the edges indicating associations between the neurons and the parameters.

In an embodiment, inference model manager 102 may partition the bipartite graph into portions that reduce the edges between the portions and are within the characteristics of the data processing systems. By doing so, neurons that share data dependencies may be included in the same portion and, therefore, hosted by the same data processing system. By grouping the neurons that share data dependencies, excess communications between data processing systems may be avoided. Consequently, overall communication bandwidth consumption may be conserved throughout the distributed environment.

In an embodiment, portions of the inference model may be obtained by another entity through obtaining the inference model and representing the inference model as a bipartite graph. The other entity may transmit the portions of the inference model (and/or instructions for obtaining the portions of the inference model) to the inference model manager 102.

At operation 303, the portions of the inference model are distributed to the data processing systems. The portions of the inference model may be distributed to data processing systems in a manner that reduces communications between data processing systems during execution of the inference model and utilizes the available computing resources of each data processing system. One portion of the portions of the inference model may be distributed to each data processing system of the data processing systems. Portions of the inference model may be distributed in accordance with an execution plan. The execution plan may include: (i) instructions for obtaining portions of the inference model, (ii) instructions for distribution of the inference model, (iii) instructions for execution of the inference model, and/or other instructions. The execution plan may be obtained in order to facilitate timely execution of the inference model in accordance with the needs of a downstream consumer of the inferences generated by the inference model. The execution plan may be generated by the inference model manager 102 and/or obtained from another entity throughout the distributed environment.

At operation 304, the inference model is executed using the portions of the inference model distributed to the data processing systems to obtain an inference model result. The inference model may be executed in accordance with the execution plan. The inference model manager 102 may execute the inference model by sending instructions and/or commands to the data processing systems 100 to initiate the execution of the inference model.

In an embodiment, the inference model may be executed using input data. The input data may be obtained by the inference model manager 102, any of data processing systems 100 and/or another entity. Inference model manager 102 may obtain the input data and transmit the input data to a first data processing system of the data processing systems 100 along with instructions for timely executing the inference model based on the input data. The instructions for timely execution of the inference model may be based on the needs of a downstream consumer with respect to the inferences generated by the inference model.

The operation may end following operation 304.

Turning to FIG. 3B, a flow diagram illustrating a method of obtaining a processing result using a portion of an inference model in accordance with an embodiment is shown.

At operation 305, a portion of an inference model is obtained from an inference model manager. The portion of the inference model may utilize the computing resources available to a data processing system (e.g., data processing system 100A). For example, data processing system 100A may include a temperature sensor, and be positioned in an industrial environment. The temperature sensor may have access to 100 units of available computing resources. The portion of the inference model obtained by the temperature sensor may require 90 units of computing resources (and/or any number of computing resources below the available 100 units).

In an embodiment, a data processing system (e.g., data processing system 100A) may obtain the portion of the inference model from inference model manager 102. Alternatively, the data processing system may obtain the portion of the inference model from another entity (e.g., another inference model manager, another data processing system, etc.) throughout the distributed environment. The data processing system may also obtain instructions regarding the timely execution of the inference model (e.g., an execution plan).

At operation 306, a processing result may be obtained using the portion of the inference model. Data processing system 100A may obtain a processing result by feeding input data into the portion of the inference model hosted by the data processing system 100A. The input data may be live (e.g., unprocessed) data and/or may be a partial processing result obtained as the output of a second portion of the inference model hosted by a second data processing system (e.g., data processing system 100B).

In an embodiment, the processing result may be a set of values, parameters, and/or other data usable by a third data processing system (e.g., data processing system 100C) as input data for a third portion of the inference model. Alternatively, the processing result may be output data usable by a downstream consumer of the inferences generated by the inference model.

At operation 307, the processing result may be provided to a user of the processing result. As previously mentioned, the user of the processing result may be a downstream consumer, another data processing system, and/or another entity.

The method may end following operation 307.

Using the methods illustrated in FIGS. 3A-3B, inference models may be distributed and executed across a range of data processing devices. Overtime, the inference model may need to be revised or replaced while the inference model continues to execute and provide inferences (e.g., used by downstream consumers).

Turning to FIG. 3C, a flow diagram illustrating a method of managing inference models hosted by data processing systems throughout a distributed environment is shown.

At operation 320, an update for an inference model is obtained. The update may be a new or updated inference model. If the inference model is an update or otherwise includes a similar architecture (e.g., of neurons), then only portions of the already-deployed inference model may be replaced with portions of the updated inference model. However, if the updated inference model includes a new architecture, then a majority or all of the already-deployed portions of the inference model may need to be replaced. However, users of the inferences generated by the already-deployed inference model may wish to continue to obtain inferences during any update processes for the already-deployed inference model. Embodiments disclosed herein may facilitate continued generation of inferences during updates to existing inference models.

At operation 322, data processing systems that host portions of the already-deployed inference model is identified. Additionally, redundancy levels for each of the portions of the already-deployed inference model may also be identified. The identifications may be performed, for example, by reading information from storage or memory. For example, the instances of the portions of the inference model may be tracked (e.g., when deployed and/or during operation through heartbeat monitoring or other processes).

At operation 324, an inference model update plan for the data processing systems is obtained. The inference model update plan may maintain operation of the inference model during deployment of the updated inference model. The inference model update plan may be based on the redundancy levels for each of the portions of the already-deployed inference model.

The inference model update plan may be obtained by setting a schedule for instantiation of instances of the portions of the updated inference model, and decommissioning of the portions of the already-deployed inference model. The inference model update plan may require, for example, that a total quantity of portions of the inference model and corresponding portions of the updated inference model meet redundancy levels. For example, the inference model update plan may require that new corresponding portions of the updated inference model be ready for operation prior to decommissioning of a corresponding portion of the already-deployed inference model. Refer to FIG. 4A for additional details regarding inference model update plans.

In an embodiment, the inference model update plan specifies a pattern of instantiation of portions of the updated inference model and decommissioning of portions of the already deployed inference model. By doing so, the inference model may remain operational until the updated inference model is ready for execution. When ready, execution of the inference model portions may be terminated, and operation of the updated inference model may take over inference generation duties.

For example, the pattern may maintain a first quantity of a first portion of the portions of the inference model that are executable and a second quantity of a corresponding portion of the portions of the updated inference model that are executable (e.g., the sum of the first quantity and second quantity) above a threshold level based on a redundancy level associated with the first portion of the portions of the inference model during the seamless changeover. The redundancy levels for each of the portions of the inference model may indicate quantities of redundant instances of the portions of the inference model hosted by the data processing systems.

The inference model update plan may also be based on an acceptable level of deviation from the redundancy levels during the seamless changeover. The acceptable level of deviation may provide for flexibility with respect to the redundancy levels. The acceptable level of deviation may specify to what extend the number of pre and post updated portions of an inference model may fall below a redundancy level.

For example, consider a scenario where a redundancy level (or other requirement for operation, such as computational path or data dependencies) for an inference model portion is 3 instances, with an acceptable level of deviation of two. During an update, the data processing systems may be given flexibility to reduce the number of instances of the pre and post updated inference model portion to two. The data processing system may do so, for example, due to computational limitations or to increase the speed of deployment for the updated inference model.

At operation 326, inference model data packages for the data processing systems are obtained. The inference model data packages may be based on the inference model update plan. Each of the inference model data packages may be individualized for corresponding data processing systems, and may include one or more updated inference model portions that will be hosted by a data processing system.

The inference model data packages may also include information regarding when corresponding portions of already-deployed inference model may be decommissioned. For example, the inference model data packages may specify an ordering of instantiations of new inference model portions and terminations of portions of the already-deployed inference model.

At operation 328, the inference model data packages are distributed to the data processing systems. The inference model data packages may be distributed by sending them to the corresponding data processing systems, and/or hosted agents which may use and implement inference models.

In the case of an update rather than a replacement, inference model data packages may only be provided to those data processing systems for which portions of the already-deployed inference model will be replaced.

At operation 330, a seamless changeover between execution of the inference model and execution of the updated inference model across the data processing systems is initiated using the distributed inference model data packages and a pattern indicated by the inference model update plan. The seamless changeover may be initiated by the instantiation and decommissioning of inference model portions in accordance with the pattern. For example, once all of the instantiations and decommissioning have been completed, execution of the updated inference model may be initiated using the newly deployed portions of the updated inference model.

The method may end following operation 330.

Using the method illustrated in FIG. 3C, embodiments disclosed herein may facilitate continued use of an inference model distributed across multiple data processing systems while the model is updated.

To further clarify embodiments disclosed herein, an example updated inference model deployment in accordance with an embodiment is shown in FIGS. 4A-4C.

Turning to FIG. 4A, a diagram illustrating a management plan for deployment of an updated inference model in accordance with an embodiment is shown. With respect to FIG. 4A, consider a scenario in which an inference model is updated using additional data that was not available at the time the inference model was originally updated. The updated inference model may be of a similar architecture to the original inference model, but may include updated weights and/or other parameters that cause the updated inference model to provide inferences that are more accurate.

To deploy the updated inference model may be portioned, and a management plan for the updated inference model may be obtained. To obtain the management plan for the updated inference model, the level of redundancy expected for the original inference model may be taken into account. In this example, the redundancy level is three instances of each portion of the original inference model.

Based on the redundancy level, a management plan may be obtained for each portion. In FIG. 4A, the management plan is illustrated using a plot where each column in the plot represents phases (e.g., phases T1-T6) of deployment of portions of the updated inference model and decommissioning of the corresponding portions of the original inference model. In FIG. 4A, the portions of the original inference model are designated as V1 and the portions of the updated inference model are designated as V2.

As seen in FIG. 4A, in the first phase, 3 instances of each of the portions of the original inference model are hosted by respective data processing systems. To start the process of deploying the updated inference model, in phase T2 a first instance of each portion of the updated inference model may begin to be deployed. At this point, the first instance of each portion of the updated inference model may not be operational. During this period of time and up until the first instances of the portions of the updated inference model are operation, three instances of each portion of the original inference model are maintained (e.g., as indicated in phases T2-T3). In FIG. 4A, boxes having partially dotted infill indicate that the corresponding portion of the updated inference model is not yet operational.

Once the first instance of each portion of the updated inference model is deployed and operation, in phase T4 one instance of each portion of the original inference model may be decommissioned and an additional instance of each portion of the updated inference model may begin to be deployed. Once the second instance of each portion of the updated inference model is operational at phase T5, then the process may repeat as seen in phase T6 where an additional instance of each portion of the original inference model is decommissioned and a third instance of each portion of the updated inference model begins deployment. The process may continue past phase T6 until all of the instances of the portions of the original inference model are decommissioned and only corresponding instances of each portion of the updated inference model remain operational.

As seen in FIG. 4A, at all points in time, the number of combined instances of each of the portions of the original and updated inference model that are operational are maintained at the redundancy level of three for the inference model. Consequently, a failure of any data processing system or multiple data processing systems may not be fatal to continued execution of at least one of the inference models (e.g., either original or updated). Consequently, downstream consumers may continue to rely on inferences even while the inference model used to obtain the inferences is being updated.

Additionally, in some embodiments, an acceptable level of deviation from the redundancy level may be allowed during inference model updates to speed deployment. For example, the acceptable level of deviation may allow an instance of the original inference model to be immediately decommissioned while a corresponding portion of the updated inference model is being updated. In such a scenario, the number of instances of each of the portions of the original inference model may be reduced by one in phases T2-T6.

Likewise, if increased numbers of instances of each portion of the updated inference model may be concurrently deployed, then the number of instances of each portion of the updated inference model may be increased in phases T2-T3 and two instances of each portion of the original inference model may be decommissioned in phase T4.

Now, consider a deployment scenario as illustrated in FIGS. 4B-4C where data processing systems 210, 220, 230 initially host inference model portion 212A and inference model portion 222A (as seen in the left hand column of FIG. 4B), which may operate in manner similar to that shown in FIG. 2C. In each of these figures, a diagram of each of the data processing systems as inference model portions are instantiated and decommissioned in accordance with an embodiment is shown.

The inference model corresponding to these inference model portions 212A, 222A may be updated. The updated inference model (which may include a new architecture) may be partitioned into inference model portions 452, 454 (which may correspond to inference model portion 212A and inference model portion 222A, respectively). As seen in FIG. 4B, inference model portion 222A may be subject to a redundancy requirement of two such that the inference model may continue to operate if one of data processing system 220 and data processing system 230 fails or is otherwise unable to continue operation the hosted instance of inference model portion 222A.

To deploy the updated inference model while meeting this redundancy requirement, a first phase of a deployment process may be performed in which an instance of inference model portion 452 is deployed to data processing system 210 and an instance of inference model portion 454 is deployed to data processing system 230, as seen in the right hand column of FIG. 4B. During these deployments, all of the portions of the original inference model may continue to operate.

Turning to FIG. 4C, a second phase of the deployment process may be performed in which the two of the portions of the original inference model are decommissioned and an additional instance of inference model portion 454 is deployed. As seen in the left hand column of FIG. 4C, inference model portion 212A hosted by data processing system 210 and inference model portion 222A hosted by data processing system 230 may be decommissioned. By doing so, the number of operational instances of inference model portion 222A and inference model portion 454 may be maintained at two, thereby meeting the redundancy level expectation for the inference model.

To complete the deployment, once inference model portion 454 hosted by data processing system 220 is operational, the instance of inference model portion 222A hosted by data processing system 220 may be decommissioned, as seen in the right hand column of FIG. 4C.

Thus, as seen in FIGS. 4A-4C, embodiments disclosed herein may facilitate deployment of updated inference models without impacting continued operation of existing inference models. Consequently, a seamless changeover between inference models may be completed. When doing so, the data processing system may manage the hosted inference model portions in accordance with a management framework. Any of the data processing systems may operate in cooperation with the other data processing systems through use of management plans deployed along with the portions of the inference model.

Figure 5:
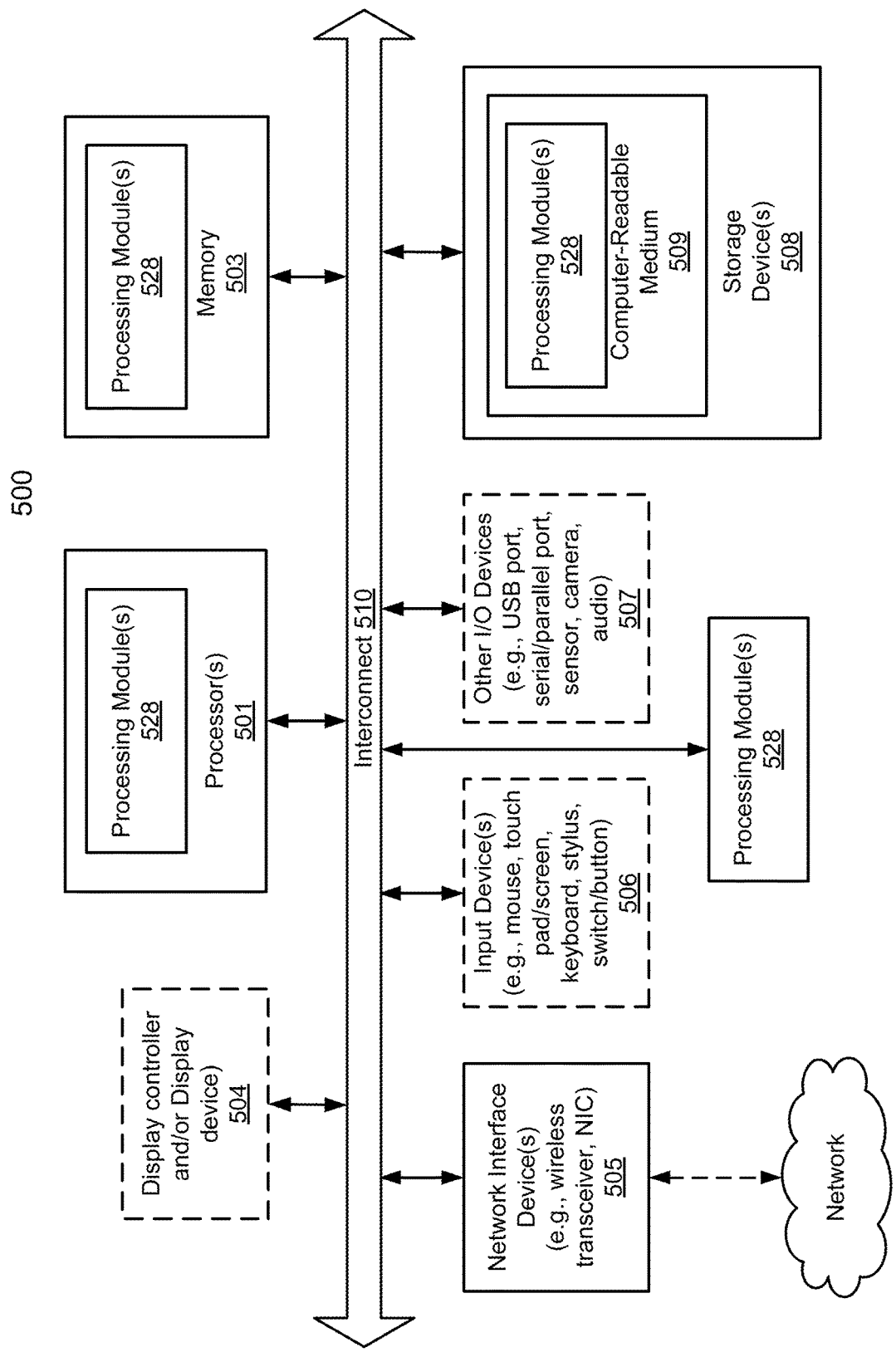
FIG. 5 shows a block diagram illustrating a data processing system in accordance with an embodiment.

Any of the components illustrated in FIGS. 1-4E may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include 10 devices such as devices (e.g., 505, 506, 507, 508) including network interface device(s) 505, optional input device(s) 506, and other optional 10 device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for executing an inference model across multiple data processing systems that each individually have insufficient computing resources to complete timely execution of the inference model, the method comprising:
    obtaining an update for the inference model deployed across the data processing system;
    identifying portions of the inference model hosted by the data processing systems and redundancy levels for each of the portions of the inference model;
    obtaining an inference model update plan that maintains operation of the inference model during deployment of portions of an updated inference model, the inference model update plan being based on the redundancy levels for each of the portions of the inference model;
    obtaining inference model data packages for the data processing systems based on the inference model update plan and the updated inference model;
    distributing the inference model data packages to the data processing systems; and
    initiating a seamless changeover between execution of the inference model and execution of the updated inference model across the data processing systems using the distributed inference model data packages and a pattern indicated by the inference model update plan.

2. The method of claim 1, wherein the pattern specifies when execution of each of the portions of the inference model is terminated as part of the seamless changeover.

3. The method of claim 2, wherein the pattern maintains a first quantity of a first portion of the portions of the inference model that are executable and a second quantity of a corresponding portion of the portions of the updated inference model that are executable above a threshold level based on a redundancy level of the redundancy levels associated with the first portion of the portions of the inference model during the seamless changeover.

4. The method of claim 1, wherein the redundancy levels for each of the portions of the inference model indicate quantities of redundant instances of the portions of the inference model hosted by the data processing systems.

5. The method of claim 4, wherein the inference model update plan is further based on an acceptable level of deviation from the redundancy levels during the seamless changeover.

6. The method of claim 5, wherein the acceptable level of deviation indicates a reduced number of instances of a portion of the portions of the inference model that may be maintained during the seamless changeover, the reduced number being less than a number of instances indicated by the redundancy levels.

7. The method of claim 6, wherein the acceptable level of deviation indicates an increased number of instances of a portion of the portions of the inference model and a complementary portion of the portions of the updated inference model that may be maintained during the seamless changeover, the increased being greater than a number of instances indicated by the redundancy levels.

8. The method of claim 7, wherein the complementary portion of the portions of the updated inference model is adapted to, after the seamless changeover, replace the functionality provided by the portion of the portions of the inference model.

9. The method of claim 1, wherein the data packages include corresponding portions of the portions of the updated inference model and management data, the management data usable to coordinate the seamless changeover.

10. The method of claim 9, wherein the management data specifies a versioning relationship between the updated inference model and the inference model.

11. A non-transitory machine-readable medium having instructions stored therein, which when executed by a processor, cause the processor to perform operations for executing an inference model across multiple data processing systems that each individually have insufficient computing resources to complete timely execution of the inference model, the operations comprising:
    obtaining an update for the inference model deployed across the data processing system;
    identifying portions of the inference model hosted by the data processing systems and redundancy levels for each of the portions of the inference model;
    obtaining an inference model update plan that maintains operation of the inference model during deployment of portions of an updated inference model, the inference model update plan being based on the redundancy levels for each of the portions of the inference model;
    obtaining inference model data packages for the data processing systems based on the inference model update plan and the updated inference model;
    distributing the inference model data packages to the data processing systems; and
    initiating a seamless changeover between execution of the inference model and execution of the updated inference model across the data processing systems using the distributed inference model data packages and a pattern indicated by the inference model update plan.

12. The non-transitory machine-readable medium of claim 11, wherein the pattern specifies when execution of each of the portions of the inference model is terminated as part of the seamless changeover.

13. The non-transitory machine-readable medium of claim 12, wherein the pattern maintains a first quantity of a first portion of the portions of the inference model that are executable and a second quantity of a corresponding portion of the portions of the updated inference model that are executable above a threshold level based on a redundancy level of the redundancy levels associated with the first portion of the portions of the inference model during the seamless changeover.

14. The non-transitory machine-readable medium of claim 11, wherein the redundancy levels for each of the portions of the inference model indicate quantities of redundant instances of the portions of the inference model hosted by the data processing systems.

15. The non-transitory machine-readable medium of claim 14, wherein the inference model update plan is further based on an acceptable level of deviation from the redundancy levels during the seamless changeover.

16. A data processing system, comprising:
    a processor; and
    a memory coupled to the processor to store instructions, which when executed by the processor, cause the processor to perform operations for executing an inference model across multiple data processing systems that each individually have insufficient computing resources to complete timely execution of the inference model, the operations comprising:
        obtaining an update for the inference model deployed across the data processing system;
        identifying portions of the inference model hosted by the data processing systems and redundancy levels for each of the portions of the inference model;
        obtaining an inference model update plan that maintains operation of the inference model during deployment of portions of an updated inference model, the inference model update plan being based on the redundancy levels for each of the portions of the inference model;
        obtaining inference model data packages for the data processing systems based on the inference model update plan and the updated inference model;
        distributing the inference model data packages to the data processing systems; and
        initiating a seamless changeover between execution of the inference model and execution of the updated inference model across the data processing systems using the distributed inference model data packages and a pattern indicated by the inference model update plan.

17. The data processing system of claim 16, wherein the pattern specifies when execution of each of the portions of the inference model is terminated as part of the seamless changeover.

18. The data processing system of claim 17, wherein the pattern maintains a first quantity of a first portion of the portions of the inference model that are executable and a second quantity of a corresponding portion of the portions of the updated inference model that are executable above a threshold level based on a redundancy level of the redundancy levels associated with the first portion of the portions of the inference model during the seamless changeover.

19. The data processing system of claim 16, wherein the redundancy levels for each of the portions of the inference model indicate quantities of redundant instances of the portions of the inference model hosted by the data processing systems.

20. The data processing system of claim 19, wherein the inference model update plan is further based on an acceptable level of deviation from the redundancy levels during the seamless changeover.

* * * * *